US009829016B2

(12) United States Patent
Gurr et al.

(10) Patent No.: US 9,829,016 B2
(45) Date of Patent: Nov. 28, 2017

(54) FLOW CONDITIONER

(71) Applicant: SICK Engineering GmbH, Ottendorf-Okrilla (DE)

(72) Inventors: Andreas Gurr, Dresden (DE); Gerry Schroter, Dresden (DE); Andreas Pfeifer, Langebruck (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 902 days.

(21) Appl. No.: 13/716,835

(22) Filed: Dec. 17, 2012

(65) Prior Publication Data

US 2013/0153074 A1    Jun. 20, 2013

(30) Foreign Application Priority Data

Dec. 19, 2011 (EP) .................................... 11009945

(51) Int. Cl.
  *F15D 1/04*  (2006.01)
  *F15D 1/06*  (2006.01)
(52) U.S. Cl.
  CPC ..................................... *F15D 1/06* (2013.01)
(58) Field of Classification Search
  USPC ..................................................... 138/39, 44
  See application file for complete search history.

(56) References Cited

U.S. PATENT DOCUMENTS 2,771,157 A * 11/1956 Gustavsson ..................... 138/44
5,937,908 A    8/1999 Inoshiri et al.
7,954,514 B2 * 6/2011 Tung et al. ...................... 138/37
2002/0179166 A1 * 12/2002 Houston et al. ................ 138/39
2005/0039809 A1    2/2005 Speldrich
2008/0060712 A1 * 3/2008 Gluzman et al. ............... 138/39

FOREIGN PATENT DOCUMENTS

| EP | 0063729 B1 | 1/1987 |
| EP | 1775560 A2 | 4/2007 |
| GB | 891212 A | 3/1962 |
| WO | 93/09353 A1 | 5/1993 |

OTHER PUBLICATIONS

European Patent Office—European Search Report for Application EP 11009945; dated Oct. 5, 2012. Originally published in German, an English Translation is attached thereto.

* cited by examiner

*Primary Examiner* — Vishal Pancholi
(74) *Attorney, Agent, or Firm* — Nath, Goldberg & Meyer; Jerald L. Meyer

(57) ABSTRACT

The invention relates to a flow conditioner for conditioning a fluid flow comprising a pipe having a constriction with a reduced pipe cross-section, at least one ring-shaped element arranged inside the pipe which has an outer diameter which is smaller than the inner diameter of the pipe in the axial region of the pipe in which the at least one ring-shaped element is arranged, and having an areal web whose surface normal is not in parallel with the pipe axis. The invention further relates to a throughflow measurement system for measuring a fluid throughflow through a pipe having a measurement device and a flow conditioner in accordance with the invention arranged upstream of the measurement device.

15 Claims, 9 Drawing Sheets

FLOW CONDITIONER

Figure 1:
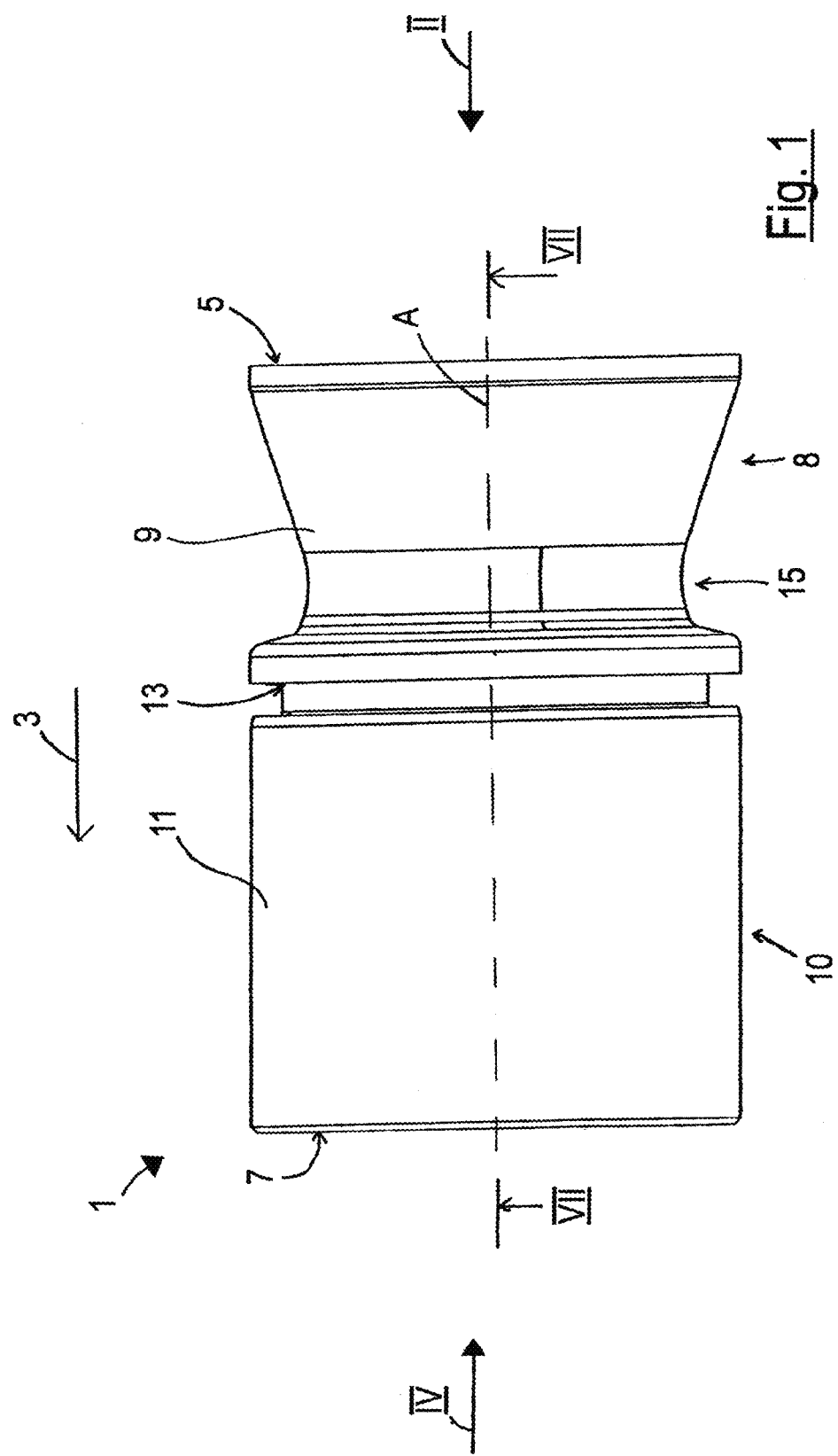

The invention relates to a flow conditioner for conditioning a fluid flow through a pipe.

Ultrasound measurement systems are used, for example, in the measurement of the speed of a fluid (that is of a gas or of a liquid) in a pipe. Ultrasonic measurement pulses are in this respect, for example, transmitted obliquely through the flowed-through pipe. The speed of the fluid in the pipe can be determined in a manner known per se from the time of flight difference of an ultrasonic signal which in this manner has a movement component in the direction of the flow prevailing in the pipe and of an ultrasonic signal which has a movement component against the flow prevailing in the pipe. Corresponding arrangements for the emission and for the reception of ultrasonic signals are in this respect located in a measurement section of the pipe.

For example, the flow situation varies as a difference from a straight and a fully developed pipe flow by changes in direction and cross-section of the pipe optionally disposed upstream of the measurement section such as are caused e.g. by manifolds, diffusers, nozzles or combinations thereof and/or installations (e.g. baffles). It is desirable in order to influence the measurement within the measurement section as little as possible by such effects, to early out a flow conditioning before the measurement section to condition the disturbed flow profile back in the direction of an undisturbed flow.

A process known from the prior art attempts to impede the non-axial flow speed components present in the disturbed flow by the installation of pipe elements or plates aligned in the direction of an undisturbed flow. This serves for the reduction of any swirl which may be present in the flow. Differences from an axial speed flow which is rotationally symmetrical per se and which may additionally be present are, however, only slightly compensated, if at all, by such pipe elements and plates.

Other solutions from the prior art provide for the use of one or more perforated plates in the flow cross-section. A breaking up of the pulse balance of all speed components can thus be achieved in the total pipe cross-section. Any non-symmetrical axial speed profile which may be present is homogenized by this breaking up. Perforated plates, however, form a comparatively high blockage of the flow cross-section and thus a backing up of the flow at the plate. A significant pressure loss therefore arises. Mixing turbulent open jets moreover form behind the perforated plate which may effect an acoustic load on the measurement section and are in particular negative for the signal acoustics of an ultrasound measurement.

It is the object of the present invention to provide an effective flow conditioning in a pipe flowed through by a fluid with as little pressure loss as possible, with swirl which may possibly be present in the flow and irregularities in the distribution of the axial speeds being effectively restricted and the influence of the flow conditioning on a measurement carried out downstream being as low as possible.

This object is satisfied by a flow conditioner for conditioning a fluid flow through a pipe having the features of claim 1. Dependent claims are directed to preferred embodiments. Claim 10 relates to a throughflow measurement system for measuring the fluid throughflow through a pipe using a flow conditioner in accordance with the invention.

The flow conditioner in accordance with the invention has a constriction with a reduced pipe cross-section. In addition, at least one ring-shaped element arranged within the pipe is provided which has an outer diameter which is smaller than the inner diameter of the pipe at the axial position of the ring-shaped element. In addition, a flow conditioner in accordance with the invention has at least one areal web whose surface normal is not aligned in parallel to the pipe axis.

The arrangement of the named three elements in the same axial region of the pipe results in an advantageous cooperation and a compact arrangement.

With an undisturbed flow, which therefore in particular has no swirl or little swirl and whose axial speed profile is substantially rotationally symmetrical, it is ensured in the arrangement in accordance with the invention by the comparatively low blocking of the pipe cross-section that the undisturbed flow is also only minimally disturbed.

The at least one ring and the at least one areal web are advantageously arranged in the follow-on flow of the constriction.

The swirl axis of a swirl which may be present is displaced into the center of the flow conditioning by the centration with the aid of the constriction. One or more webs whose surfaces advantageously extend both in parallel to the pipe axis and radially outwardly in the pipe effectively impede any swirl present. The tangential speed portions determining the swirl are maximally distributed over the side surfaces of the web or webs by the centration in the center of the conditioning.

If the surface normal of the at least one web is aligned completely perpendicular to the pipe axis, this effect is the strongest.

In an embodiment of the flow conditioner in accordance with the invention, a plurality of areal webs are provided which are arranged tapered against the flow direction, i.e. are arranged such that the areal web extends against the flow in the pipe center. On the other hand, a plurality of webs could be provided which are tapered in the flow direction, i.e. which extend against the flow in the region of the pipe rim. The flow follow-on of a web part which is first impacted by the flow will again impact on a differently tapered web in such an arrangement so that the swirl-reducing effect is amplified. "Follow-on flow" here means the flow subsequent to the respective flow-conditioning element.

This effect is particularly pronounced when the webs tapered against the flow direction and the webs tapered in the flow direction alternate in the peripheral direction of the pipe. The alternating direction of the webs additionally induces shear flow between the follow-on portions which are oppositely orientated in the radial direction with each next web in the peripheral direction.

Any desired number of webs can generally be provided. In a particularly preferred embodiment, six webs are tapered against the flow direction and six are tapered in the flow direction and are preferably arranged alternately in the peripheral direction.

A simple embodiment includes three respective webs tapered in the flow direction and three respective webs tapered against the web direction.

The flow is centered and accelerated by the constriction so that it flows through the at least one ring provided in accordance with the invention with a comparatively high pulse. The flow breaks off differently at positions in the peripheral direction at the rear ring edge; the most at the site with the highest axial speeds. A higher mixing is produced in all directions in this manner, whereby any non-regular inflow which may be present with different axial speed components are homogenized.

This effect can be amplified by a second ring or by more rings of optionally different diameters and of optionally different axial positions.

In addition, the profile shapes of the ring can be selected with sharp edges to amplify the effect.

Different diameters of the individual rings allow an ideal effect since a free flow onto them is possible. For example, the ring-shaped element arranged downstream in the flow direction can have a larger diameter.

At least one of the ring-shaped elements is located in an axial region of the pipe in which the effect of the constriction on the flow has not yet faded. The ring-shaped element arranged upstream in the flow direction (which is therefore the first to be flowed against by the flow) is in particular located for this purpose in the axial region of the at least one constriction such that the pipe cross-section has not yet completely expanded to the original pipe cross-section again after the constriction at the axial position of the ring-shaped element arranged upstream.

To achieve an ideal cooperation of the ring-shaped elements and of the at least one web, in an advantageous embodiment with at least two ring-shaped elements, at least half of the axial extent of the web is provided in the axial region between the ring-shaped elements.

A simple embodiment provides that at least one of the rings is used for holding the at least one web.

A further development of the flow conditioner in accordance with the invention has an inner pipe with a smaller diameter than the diameter of the pipe which is flowed through, with the axis of the inner pipe preferably being in parallel to and further preferably the same as the axis of the pipe which is flowed through. Such an inner pipe arranged in the center of the flow cross-section has an additionally stabilizing effect, in particular with low throughflows.

A simple embodiment provides that the inner pipe is held by at least one web.

The individual elements of the flow conditioning, that is the contraction, the at least one ring-shaped element, the at least one areal web and, optionally, the inner pipe, are advantageously located in a common axial region of the pipe. The axial extent of the combination of the flow-conditioning elements is preferably smaller than five times the pipe diameter, particularly preferably smaller than twice the pipe diameter.

The axial extent of the webs can in particular advantageously be smaller than twice the pipe diameter and particularly advantageously smaller than the simple pipe diameter.

If a plurality of ring-shaped elements are provided, their axial spacing is likewise advantageously smaller than twice the pipe diameter, particularly advantageously smaller than the simple pipe diameter.

The pipe itself can be single-part or multi-part. Individual or all components of the flow conditioner can also be provided as installations in an existing pipe.

The flow conditioner in accordance with the invention having a combination of constriction, ring-shaped element and areal web ensures that every inflow having non-axial speed components (that is with swirl) and differences from a rotationally symmetrical profile is conditioned proportionally to its properties in swirl and asymmetry. Strong flows are influenced more. It is thus achieved that the conditioning is hardly measureable with an undisturbed inflow. In addition, disturbances are not also additionally fomented under particularly unfavorable conditions.

The arrangement in accordance with the invention can in principle condition any shape of a disturbed flow. Unlike conventional conditioning processes, a better effect is achieved with a substantially smaller pressure loss, which is in particular achieved by the cooperation of the individual elements.

The invention is furthermore directed to a throughflow measurement system for measuring a fluid throughflow through a pipe. The throughflow measurement system in accordance with the invention has a measuring instrument for carrying out a measurement on the fluid. An ultrasound measurement is preferably provided and in particular the fluid speed can be measured.

A flow conditioner in accordance with the invention is arranged upstream of the measuring instrument. The conditioning of the flow achieved using the flow conditioner in accordance with the invention reduces disturbances through irregular flow, through swirl, through an irregular distribution of the axial speed components or through unfavorable acoustic signal effects due to turbulences such that the determination of the time of flight difference of an ultrasound measurement for determining the fluid speed is possible very exactly.

Figure 2:
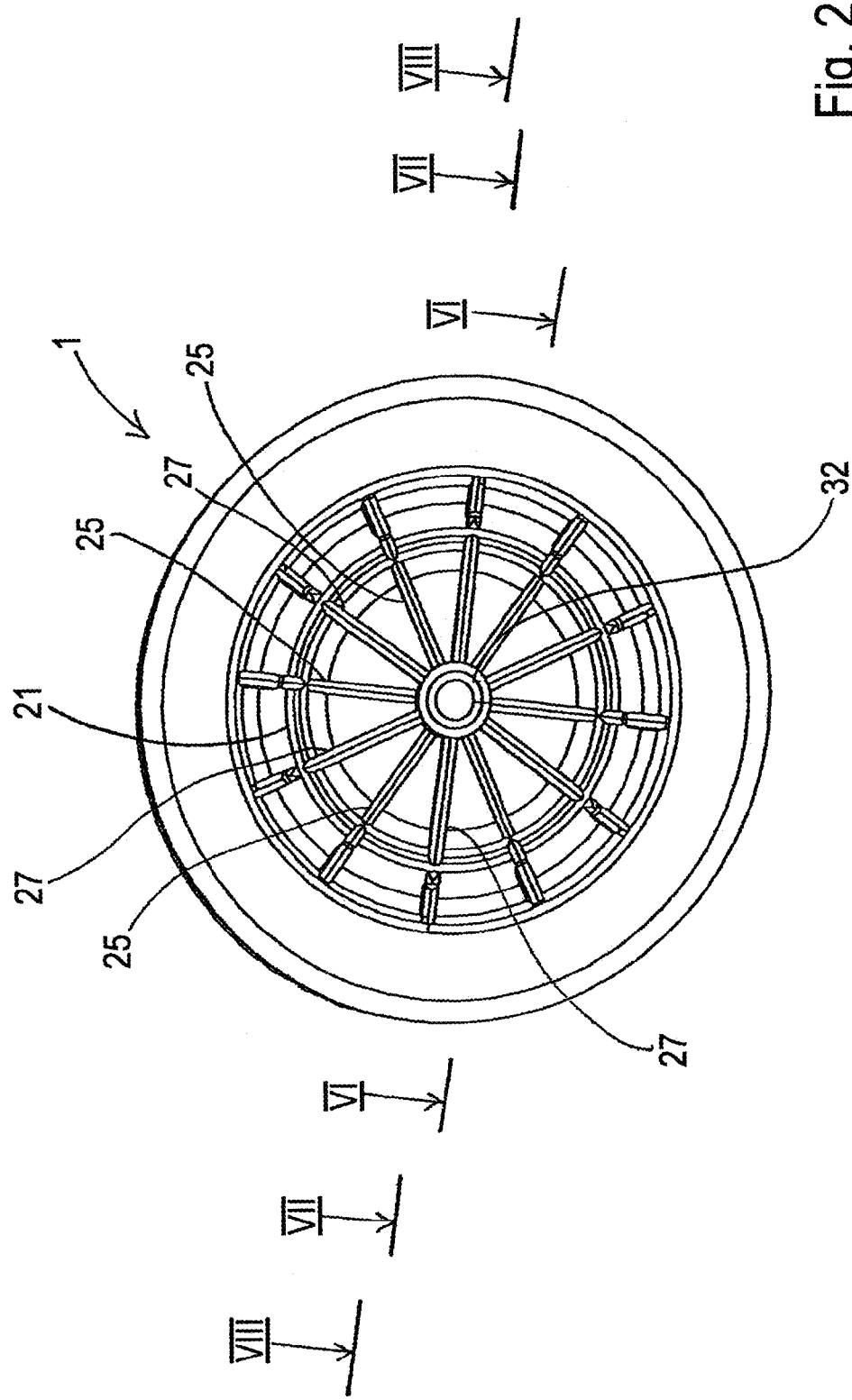
Figure 3:
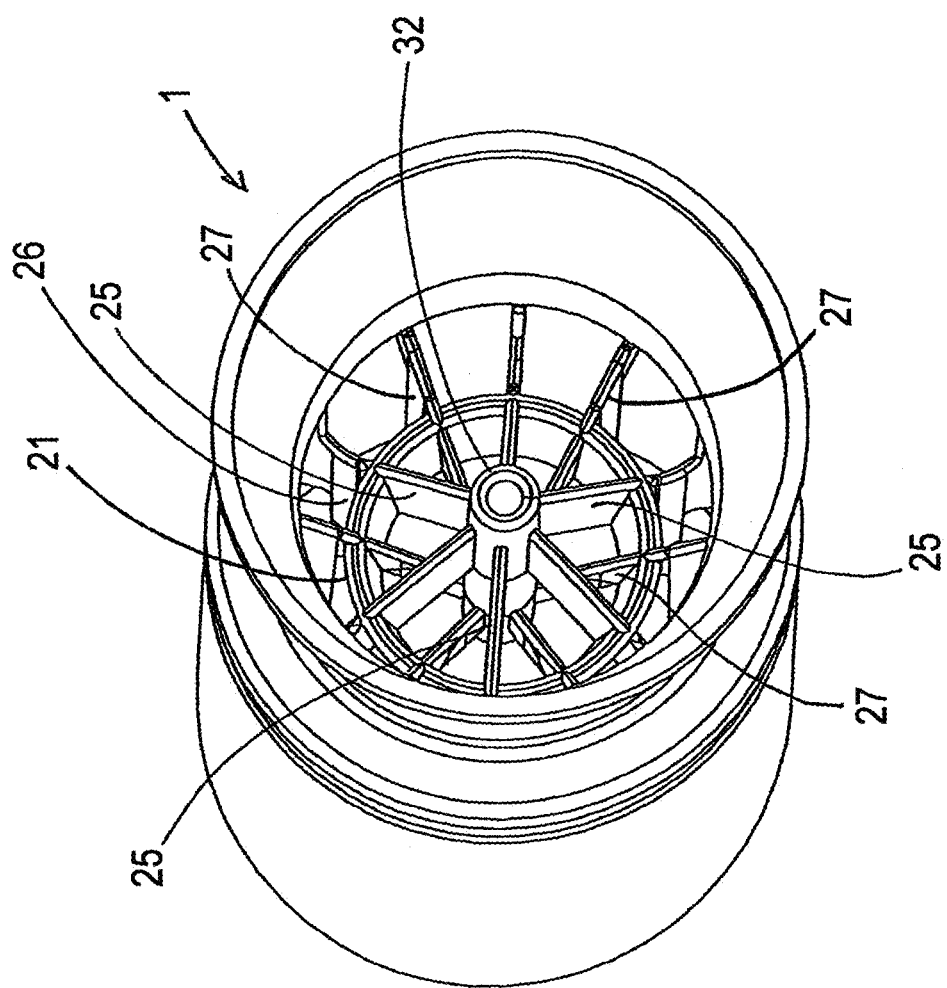
Figure 4:
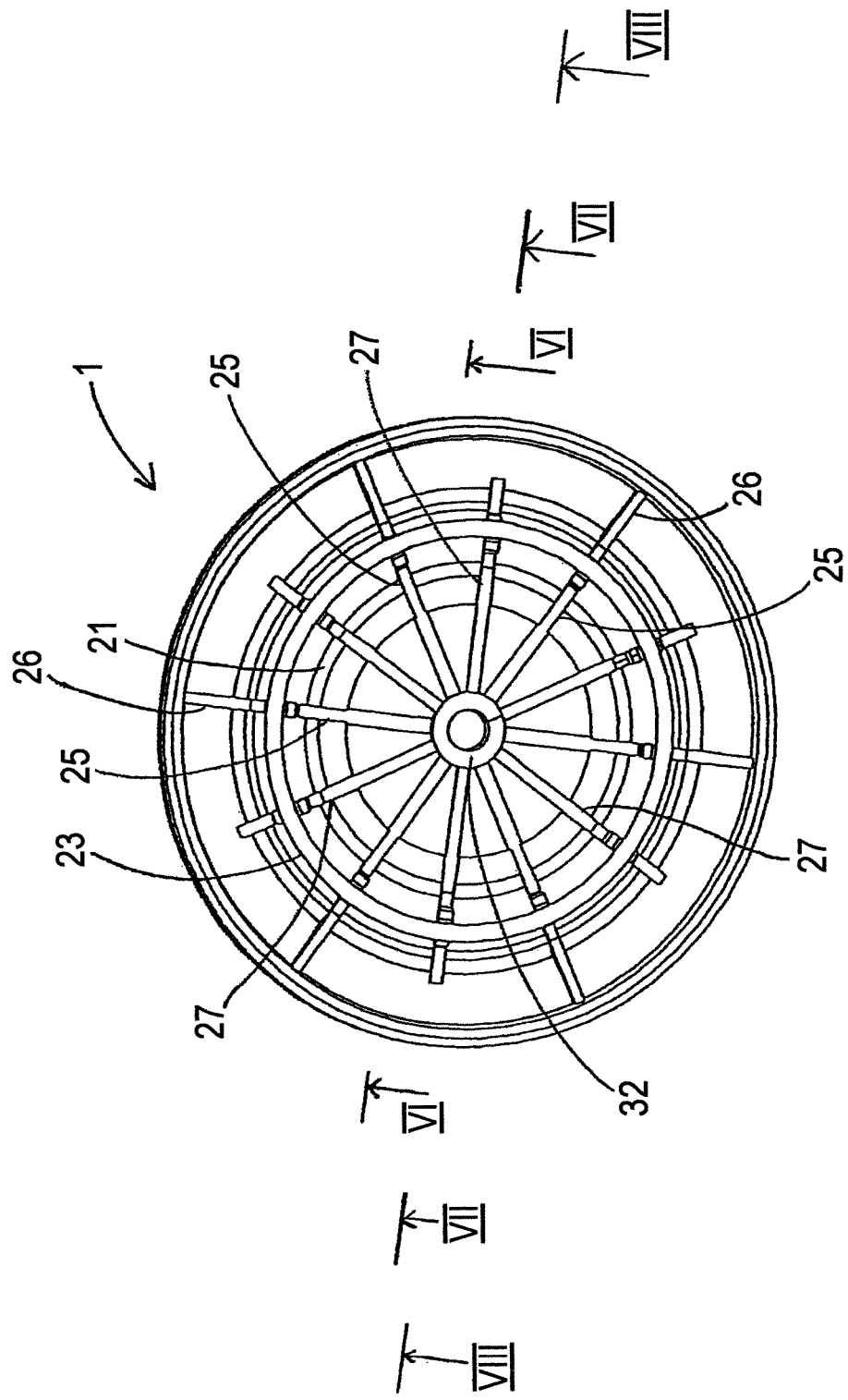
Figure 5:
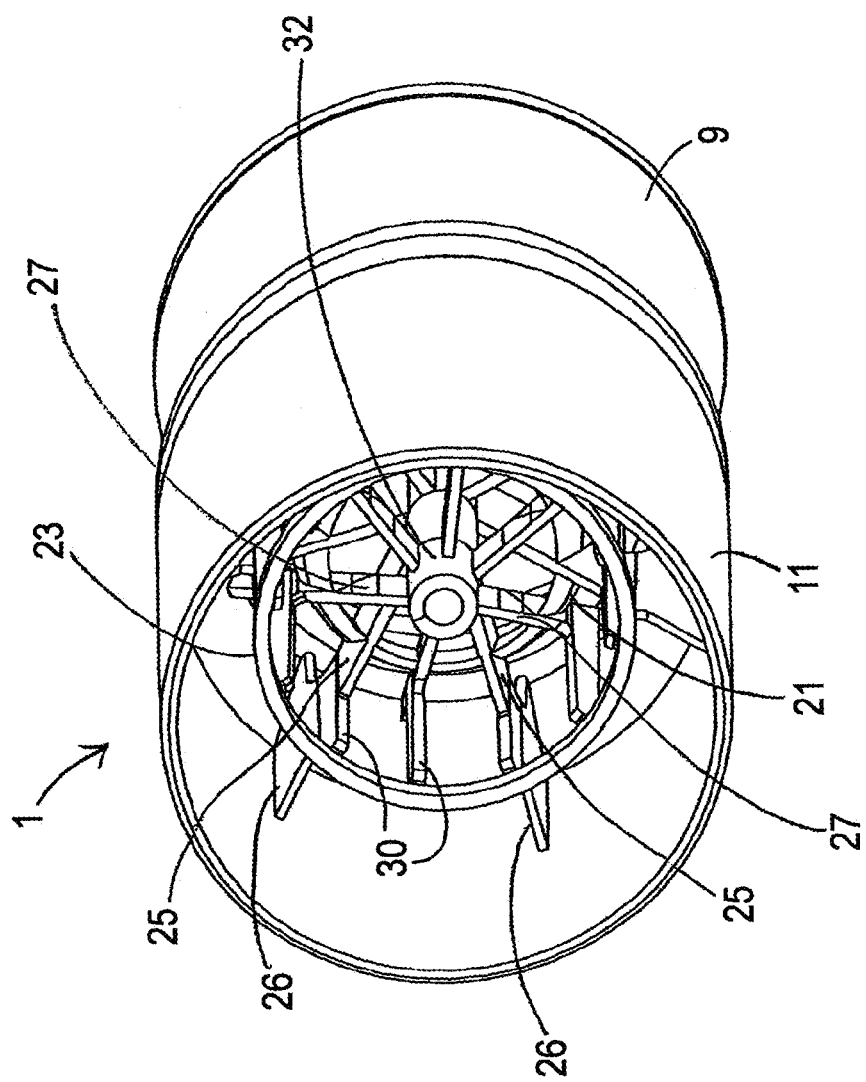
Figure 6:
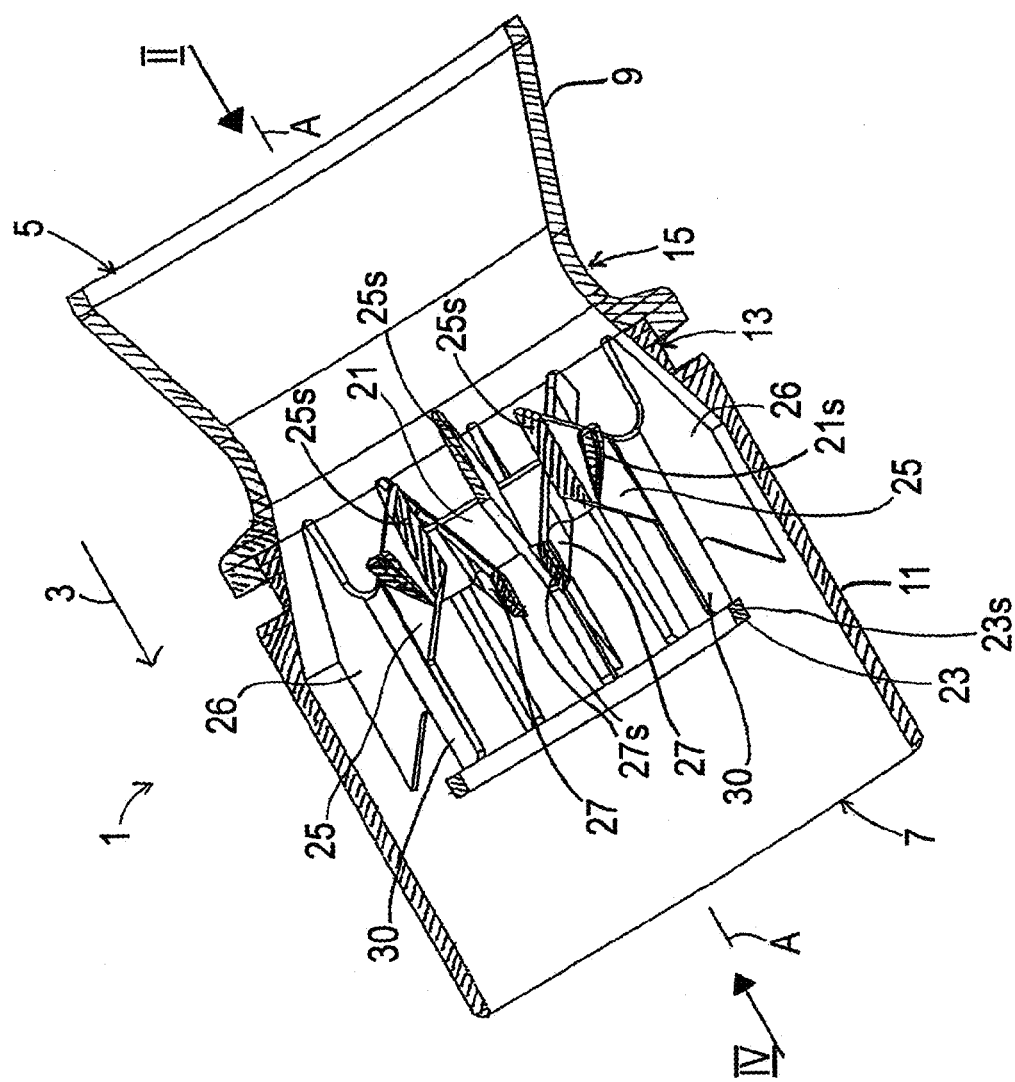
Figure 7:
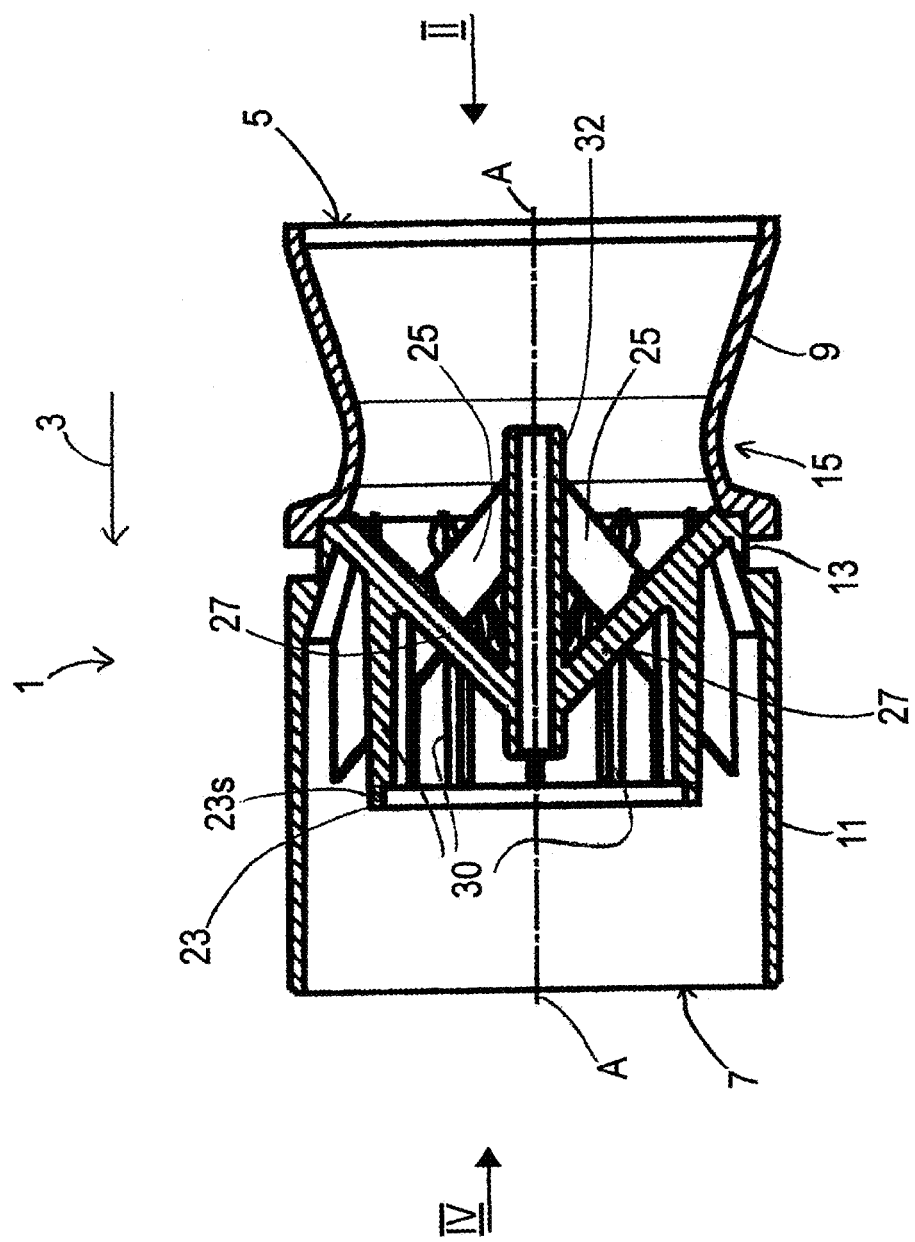
Figure 8:
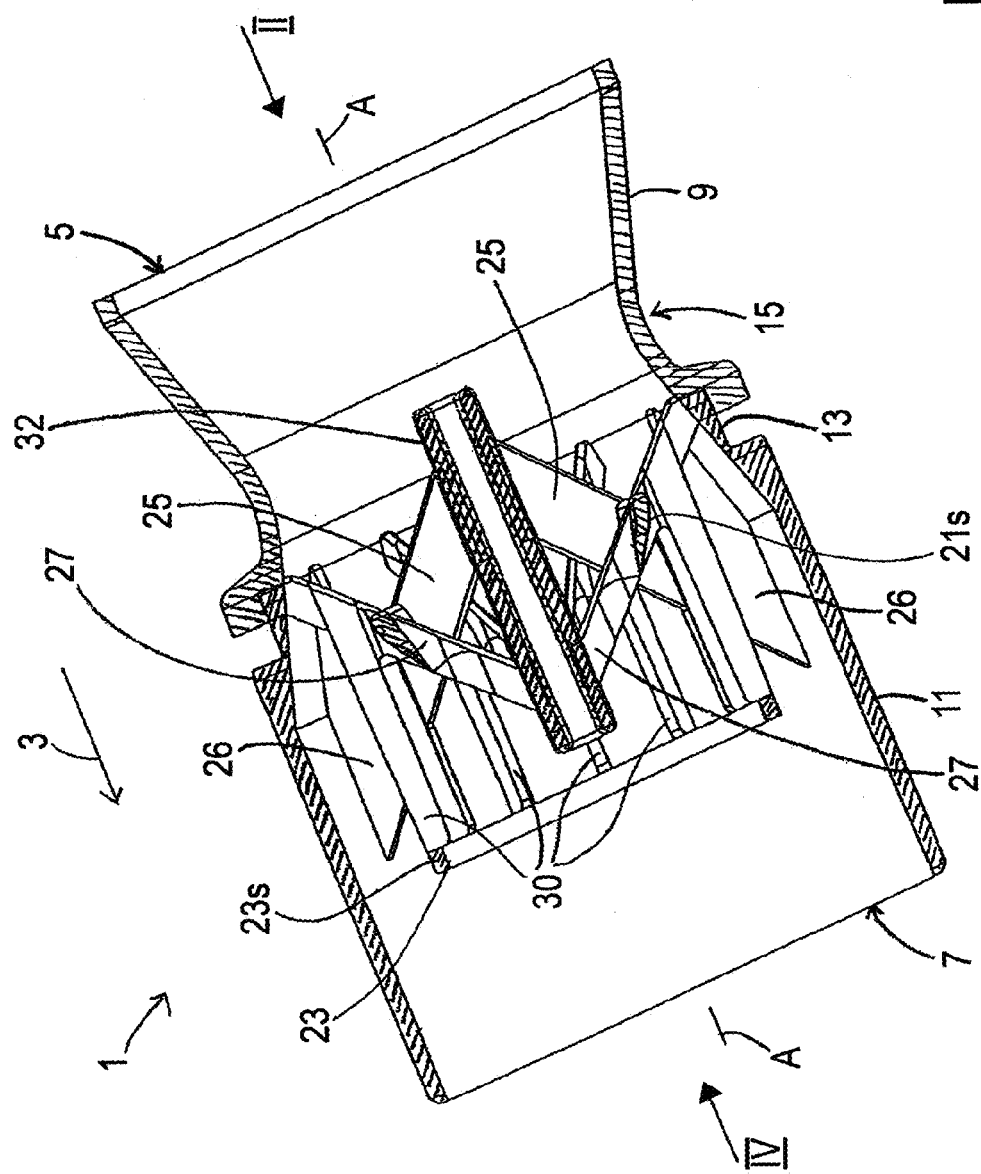
Figure 9:
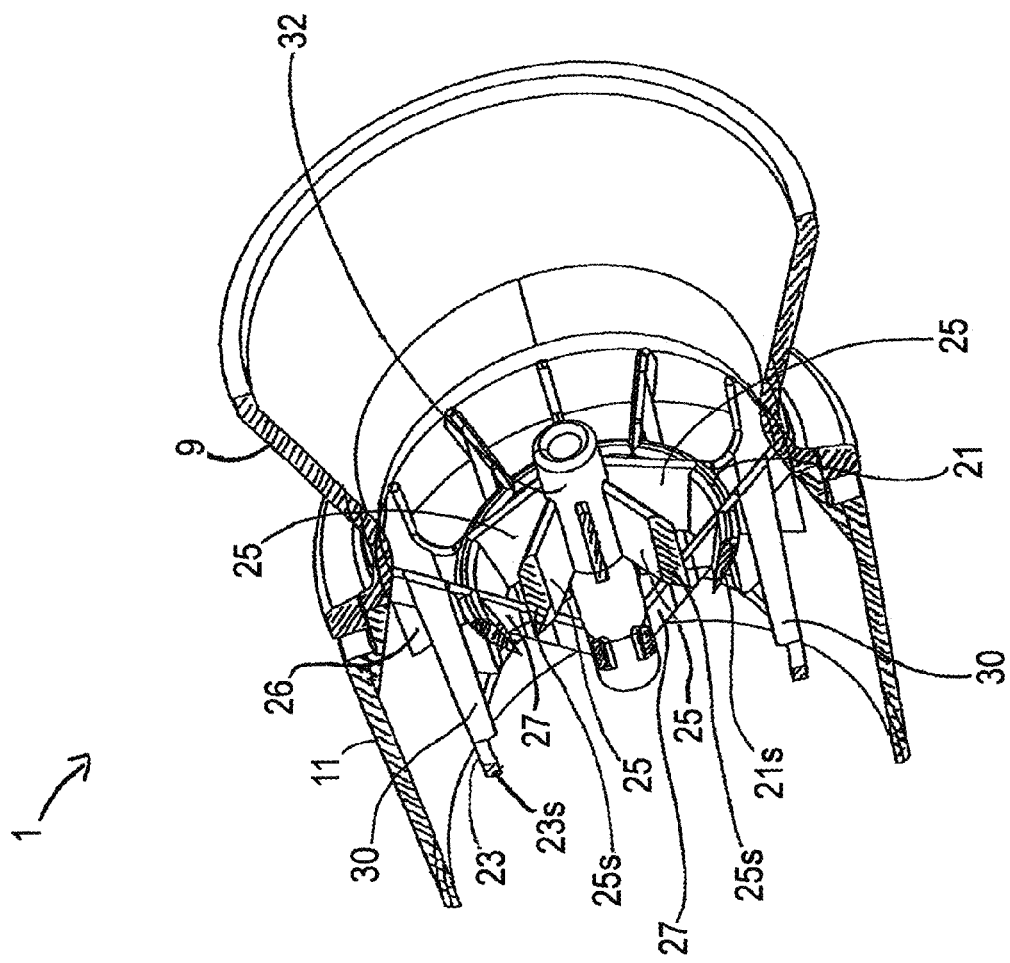

The invention will be explained in detail in the following with reference to an embodiment in accordance with the invention which is shown in the Figures. There are shown:

FIG. 1 a side plan view of an embodiment of a flow conditioner in accordance with the invention;

FIG. 2 a plan view of the flow conditioner of FIG. 1 in the direction of gaze II given in FIG. 1;

FIG. 3 an oblique plan view of the same side which is shown in FIG. 2;

FIG. 4 a view of the flow conditioner of FIG. 1 in the direction of gaze IV such as is given in FIG. 1;

FIG. 5 an oblique plan view of the same side which is shown in FIG. 4;

FIG. 6 a side section through the flow conditioner of FIG. 1 in a sectional plane such as is given by VI in FIGS. 2 and 4;

FIG. 7 a side section through the flow conditioner of FIG. 1 in a sectional plane such as is given by VII in FIGS. 1, 2 and 4;

FIG. 8 a side section through the flow conditioner of FIG. 1 in a plane such as is given by VIII in FIGS. 2 and 4; and FIG. 9 an oblique elevation of the flow conditioner of FIG. 1;

FIG. 1 shows in a side plan view a flow conditioner 1 which can be used, e.g. as an intermediate element, in a pipe flowed through by a fluid. Reference numeral 3 designates the flow direction of the fluid in the flow conditioner 1. The fluid flows e.g. through an inflow pipe into the flow conditioner 1 which is fastened, e.g. flanged, in a manner known per se to the lug of the flow conditioner 1 shown at the right in FIG. 1. The fluid flows out of the flow conditioner 1 again at the side shown at the left in FIG. 1, e.g. into an outflow pipe which is likewise fastened, e.g. flanged, in a manner known per se to the side 7. Reference numeral 5 correspondingly designates the inflow side, whereas reference numeral 7 designates the outflow side. The flow conditioner shown comprises two parts 8, 10 and includes to pipe parts 9, 11 which are connected to one another in a manner known per se at the lug 13.

A flow conditioner in accordance with the invention does not have to comprise two parts, however. In addition, it can also be implemented directly in a pipe which is flowed through without this representing an insert part to be flanged therebetween.

Reference numeral 15 designates a constriction in the pipe cross-section in the first part 8 of the flow conditioner 1. The pipe axis is designated by A.

Differing from the embodiment shown in which the pipe 9, 11 has a corresponding indentation, the constriction can also be obtained by an installation element reducing the cross-section in an otherwise uniform pipe.

FIG. 2 shows a plan view of the inflow elements 5 of the flow conditioner 1 shown in FIG. 1, that is in the direction of gaze II given there. FIG. 3 likewise shows a plan view of the side 5 in a slightly slanted position. The view in FIGS. 2 and 3 is therefore through the constriction 15 to the inner workings of the flow conditioner 1 which will be explained in more detail further below.

FIG. 4 shows a view of the outflow side 7 in the direction of gaze IV, as is indicated in FIG. 1. FIG. 5 shows a view of the same side of the flow conditioner in a slightly slanted position. FIGS. 4 and 5 allow a view of the inner workings of the flow conditioner 1 which will be explained in more detail further below.

FIGS. 6, 7 and 8 show side sections through the flow conditioner 1 along the sectional plane which is indicated by VI, VII and VIII in FIG. 2. In addition, in FIGS. 6, 7 and 8 the directions of gaze II and IV are indicated which correspond to FIGS. 2 and 4.

FIG. 9 additionally shows for better illustration an elevated view of the flow conditioner 1 in a slanted view.

It can be seen from the Figures that the following installations are located inside the two parts 8, 10 of the flow conditioner 1:

A first ring 21 can in particular easily be recognized in FIGS. 2, 3, 6, 8 and 9. In the lateral sectional views of FIGS. 6, 8 and 9, its sectioned surfaces 21s can also clearly be seen.

In the embodiment shown, the first ring 21 is formed with sharp edges in the follow-on direction.

A second ring 23 can furthermore be seen in the Figures which is arranged behind the first ring 21 in the follow-on direction. The ring 23 can be recognized particularly clearly in FIGS. 4, 5, 6, 7, 8 and 9. The sectional surfaces of the ring 23 visible in the side sections of FIGS. 6, 7, 8 and 9 are designated by reference numeral 23s. The diameter of the second ring 23 is larger than the diameter of the first ring 21. It is in particular ensured by the different diameters that a fluid flowing in the flow direction 3 can fully impact on both rings.

In addition, webs 25, 27 are provided in the flow conditioner 1 which extend radially outwardly and in parallel to the pipe axis A.

The first webs 25 are tapered against the flow direction 3, whereas the second webs 27 are tapered in the flow direction 3. The term "tapering" against the direction of flow is used in this respect to indicate for the webs 25 that they extend against the flow 3 in the pipe center. A web arrangement "tapered in the direction of the direction of flow 3", such as the webs 27 show, extends in the downstream direction in the pipe center.

In the embodiment shown, six first webs 25 are provided which are tapered against the flow direction 3 and six second webs 27 which are tapered in the flow direction 3. These two types of web 25, 27 are arranged alternately.

The sectional surfaces 25 and 27 respectively are designed by reference numerals 25s and 27s in the corresponding sectional representations of FIGS. 6, 7, 8 and 9.

The webs 25 have radially outwardly arranged regions 26 at which they are fastened within the pipe of the second flow conditioner 11.

The radially outer fastening parts 26 and the webs 25 tapered against the flow direction 3 can in this respect be formed in one piece and have the same areal alignment. The fastening parts 26 in this respect then each form a part of the webs 25.

All the webs in the embodiment shown have prolongations 30 which bear the ring 23 disposed downstream in the flow direction 3.

In particular those elements which can be recognized with the first ring 21, the second ring 23, the tapered webs 25, 27, the fastening regions 26 and the prolongations 30 for bearing the second ring 23 are not all respectively marked by the corresponding reference numerals in the Figures for reasons of clarity. Only respective representative reference numerals are added in the Figures.

In the region close to the axis, the webs 25, 27 bear an inner pipe 32 whose axis corresponds to the pipe axis A.

The axial extent of the arrangement of rings 21, 23, webs 25, 27 and inner pipe 32 is in this embodiment approximately as large as the inner diameter of the pipe of the flow conditioner 1 in a region in which the constriction 15 is not located, that is here e.g. in the region of the second pipe part 11. The arrangement of rings 21, 23, webs 25, 27 and inner pipe 32 adjoins the constriction 15 in the flow direction 3.

The inner structure of the flow conditioner 1 is mutually connected by the connection of the webs 25 tapered against the flow direction 3 via the inner pipe 32 or via the prolongations 30 and the second ring 23 with the webs 27 tapered in the flow direction 3 The unit is carried by the fastening regions 26 in the radially outwardly arranged regions of the webs 25. The total arrangement can also be in one piece, for example a one-piece plastic part.

The embodiment shown is used as follows.

The flow conditioner 1 is placed in a fluid pipe, with the embodiment shown being interposed by flanging as an intermediate piece in the fluid pipe. In the follow-on of the flow conditioner 1 (that is on the left hand side in FIG. 1), an ultrasound measurement e.g. follows downstream with which the throughflow speed of a fluid, e.g. of a gas, can be measured in a manner known per se.

Disturbances in the flow such as are e.g. caused by curves, constrictions or similar upstream (that is on the right hand side in FIG. 1) in the fluid pipe region disposed before the flow conditioner 1 are effectively combated by the flow conditioner 1.

In this respect, the constriction 15 effects a centration and an acceleration of the flow. The first ring 21 breaks up the core flow and asymmetry. A first mixing in the follow-on of the ring 21 arises which homogenizes an unequal axial speed profile. The second ring 23 amplifies this effect.

The tapered webs 25 and 27 and the inner pipe 32 further divide the follow-on and increase the mixing. This is in particular advantageous with an inflow with swirl. A swirl axis of any swirl which may be present is displaced into the center of the pipe axis A by the previously occurring centration of the flow by the constriction 15. In this manner, the tangential speed portions determining the swirl are maximally distributed over the side surfaces of the webs. The follow-on of a web directed to the front impacts again on a rearwardly directed web due to the alternating tapering of the webs 25, 27. The alternating direction of the web tapering moreover additionally induces shear flow between the follow-on portions which are oppositely orientated in the radial direction with each next web in the peripheral direction.

The cooperation of the constriction 15, the areal webs 27, 27 and the rings 21, 23 therefore serves in a particularly effective manner for the flow conditioning for a measurement in the follow-on of the flow conditioner 1 which is as undisturbed as follows.

REFERENCE NUMERAL LIST 1 flow conditioner
3 fluid flow direction
5 inflow side
7 outflow side
8 first part of the flow conditioner
9 first pipe part
10 second part of the flow conditioner
11 second pipe part
13 lug
15 constriction
21 first ring
21s sectioned surface of the first ring
23 second ring
23s sectioned surface of the second ring
25 web tapered against the flow direction
25s sectioned surface of the first web
26 fastening regions for fastening the webs 25
27 web tapered in the flow direction
27s sectioned surface of the second web
30 prolongation
32 inner pipe
A pipe axis
II, IV direction of gaze
VI, VII, VIII cross-sectional surface

The invention claimed is:

1. A flow conditioner (1) for conditioning a fluid flow which comprises the following:
   a pipe (9, 11) having a constriction (15) with a reduced pipe cross-section;
   at least one ring-shaped element (21, 23) which is arranged inside the pipe (9, 11) and which has an outer diameter which is smaller than the inner diameter of the pipe (9, 11) in the axial region of the pipe (9, 11) in which the at least one ring-shaped element is arranged; and
   at least one areal web (25, 27) whose surface normal is not in parallel to the axis (A) of the pipe (9, 11),
   wherein a plurality of webs (25) are provided which are tapered against a flow direction (3) and a plurality of webs (27) are provided which are tapered in the flow direction (3), and
   wherein the webs (25) tapered against the flow direction and the webs (27) tapered in the flow direction are alternately arranged in the peripheral direction of the pipe (9, 11).

2. A flow conditioner (1) in accordance with claim 1, wherein the surface normal of the at least one web (25, 27) is perpendicular to the direction of the pipe axis (A).

3. A flow conditioner (1) in accordance with claim 1, wherein a surface of the at least one web (25, 27) in the pipe (9, 11) extends radially outwardly.

4. A flow conditioner in accordance with claim 1, wherein at least two ring-shaped elements (21, 23) are arranged inside the pipe (9, 11) which have an outer diameter which is smaller than the inner diameter of the pipe (9, 11) in the axial region of the respective ring (9, 11).

5. A flow conditioner in accordance with claim 4, wherein the at least two ring-shaped elements (21, 23) have different diameters.

6. A flow conditioner in accordance with claim 4, wherein the ring-shaped element (21) arranged upstream in the flow direction is located in the axial region of the at least one constriction (15).

7. A flow conditioner in accordance with claim 4, wherein the at least one web (25, 27) is located with at least half its axial extent in the axial region between the ring-shaped elements (21, 23).

8. A flow conditioner in accordance with claim 1, wherein the at least one ring-shaped element (23) is held by at least one web (25, 27).

9. A flow conditioner in accordance with claim 1, wherein at least one inner pipe (32) has a smaller diameter than the diameter of the pipe (9, 11).

10. A flow conditioner in accordance with claim 9, wherein the at least one inner pipe (32) is held by at least one web (25, 27).

11. A flow conditioner in accordance with claim 9, wherein the axis of the inner pipe (32) is in parallel to the pipe axis (A) of the pipe (9, 11).

12. A flow conditioner in accordance with claim 9, wherein the axis of the inner pipe (32) coincides with the pipe axis (A) of the pipe (9, 11).

13. A throughflow measurement system for measuring a fluid throughflow through a pipe comprising
   a measurement device for carrying out a measurement at the fluid; and
   a flow conditioner (1) arranged upstream of the measurement device, wherein the flow conditioner (1) comprises
   a pipe (9, 11) having a constriction (15) with a reduced pipe cross-section;
   at least one ring-shaped element (21, 23) which is arranged inside the pipe (9, 11) and which has an outer diameter which is smaller than the inner diameter of the pipe (9, 11) in the axial region of the pipe (9, 11) in which the at least one ring-shaped element is arranged; and
   at least one areal web (25, 27) whose surface normal is not in parallel to the axis (A) of the pipe (9, 11),
   wherein a plurality of webs (25) are provided which are tapered against a flow direction (3) and a plurality of webs (27) are provided which are tapered in the flow direction (3), and
   wherein the webs (25) tapered against the flow direction and the webs (27) tapered in the flow direction are alternately arranged in the peripheral direction of the pipe (9, 11).

14. A throughflow measurement system in accordance with claim 13, wherein the measurement device is an ultrasound measurement device.

15. A throughflow measurement system in accordance with claim 13, wherein the measurement device is adapted to measure a speed of the fluid.

* * * * *